7/15/80 OR 4,212,208 SR

United States Patent [19]

Weale et al.

[11] 4,212,208

[45] Jul. 15, 1980

[54] VIBRATION DETECTOR INCORPORATING TWO OR MORE SEISMIC ELEMENTS

[75] Inventors: John L. Weale, Camberley; Stephen P. Wiles, Basingstoke, both of England

[73] Assignee: Inertia Switch Limited, Hampshire, England

[21] Appl. No.: 927,568

[22] Filed: Jul. 24, 1978 (Under 37 CFR 1.47)

[30] Foreign Application Priority Data

Jul. 22, 1977 [GB] United Kingdom ............... 30975/77

[51] Int. Cl.[2] ............................................... G01V 1/16

[52] U.S. Cl. ................................ 73/652; 200/61.45 R

[58] Field of Search .......................... 73/652, 654, 649; 340/17 R, 566; 200/61.45 R, 61.45 M, DIG. 29; 74/155, 2; 367/14

[56] References Cited

U.S. PATENT DOCUMENTS

| | | | |
|---|---|---|---|
| 1,412,002 | 4/1922 | Hendricks | 200/8 R |
| 2,799,741 | 7/1957 | Ullman . | |
| 3,560,680 | 2/1971 | Clarke | 200/61.45 R |
| 3,763,484 | 10/1973 | Byers | 200/61.45 R |
| 3,886,339 | 5/1975 | Jubenville et al. | 200/61.45 M |
| 4,020,302 | 4/1977 | Hasegawa et al. | 200/61.45 R |
| 4,086,807 | 5/1978 | Nakada | 73/652 |

FOREIGN PATENT DOCUMENTS

| | | |
|---|---|---|
| 449640 | 7/1959 | Fed. Rep. of Germany . |
| 1640558 | 7/1975 | Fed. Rep. of Germany . |
| 2606790 | 9/1976 | Fed. Rep. of Germany . |
| 1162994 | 9/1969 | United Kingdom . |
| 253891 | 7/1969 | U.S.S.R. . |

*Primary Examiner*—Stephen A. Kreitman
*Attorney, Agent, or Firm*—Cushman, Darby & Cushman

[57] ABSTRACT

A vibration responsive detector with two seismic elements mounted on a pair of parallel, electrically conductive rods, the rods being bent to cause the elements to tend to move toward each other and to be maintained in electrical connection so that a break in the connection indicates vibration.

10 Claims, 9 Drawing Figures

VIBRATION DETECTOR INCORPORATING TWO OR MORE SEISMIC ELEMENTS

TECHNICAL FIELD

The invention relates to vibration responsive detectors in which seismic means are mounted on supports so as to provide an electrical connection between the supports. The supports may therefore be connected to detection circuits to ascertain when there is a break in the electrical connection between the supports as a result of the seismic means lifting from at least one of the supports as a result of vibration imposed on the detector.

BACKGROUND ART

When constructing detectors such as this, great care must be paid to cleanliness, dimensional accuracy and quality control, because small quantities of foreign matter can drastically reduce the reliability of the detector apparatus. Thus, where cylindrical or spherical seismic elements are mounted on wire supports, there are only point contacts or, at most, line contacts between the electrically conductive members. This means that a small amount of non-conducting foreign material can render the operation of the detecting apparatus unacceptably inaccurate in that the open circuit condition will be indicated far too frequently as a result of the contacting surfaces being separated by insulating foreign matter.

One technique which has been utilised to overcome this deficiency is the use of two or more seismic elements which are mounted on separate or common supports so as to provide parallel electrical paths which are each connectable to the vibration detecting circuits. However, although this technique results in a marked improvement in reliability of the vibration responsive detectors constructed in this way, these detectors are relatively expensive to manufacture, for the improvement obtained, and it is necessary to construct these detectors under the same stringent conditions necessary when constructing vibration responsive detectors having only one seismic element each.

DISCLOSURE OF THE INVENTION

It is an object of the present invention to provide a vibration responsive detector which has a much higher reliability than a single element detector, but is more easily and cheaply constructed than hitherto known forms of vibration responsive detectors having more than one seismic element, and to provide a greater number of multiple paths for electric current than the number of seismic elements.

According to the invention, there is provided a vibration responsive detector comprising at least one pair of parallel, electrically conductive rods, at least two seismic elements, having electrically conductive outer surfaces, mounted on the rods of said one pair so as to provide parallel electrical connections between these two rods, and positioning means for urging each seismic element into contact with an adjacent seismic element so as to ensure electrical connection between adjacent elements irrespective of relative movement of adjacent elements transversely of the rods.

In one form of the invention, where the two seismic elements both contain ferro-magnetic material, the positioning means comprise magnet means positioned so as to provide a magnetic field which urges the two seismic elements towards each other and therefore into contact with each other or into contact with adjacent sides of one or more seismic elements. The magnet means preferably comprise one or more permanent magnets which may be either at one or both ends of the detector or laterally disposed in planes through the mid-points of chosen pairs of support rods. Clearly, the disposition and strength of the magnet means can be chosen so as to influence the sensitivity of the detector and, also, to permit mounting of the detector with its axis other than horizontal.

Where the electrically conductive rods extend horizontally, the positioning means may comprise concave support surfaces respectively provided on each of said two rods and arranged so as to support the seismic elements so that each of the seismic elements is urged, under gravity towards the lowermost parts of the support surfaces provided on the rods and, thereby, into engagement with at least one adjacent seismic element.

Thus, if one of the seismic elements is separated from the support surface of one of the rods, the connection between the rods will still be maintained by each other seismic element and also as a result of the fact that although this one element is separated from one of the rods, it remains in contact with the other of the rods and at least one other seismic element, thus providing further connection between the rods. It is therefore clear that the detector does not provide a condition indicative of vibration unless all the elements are out of contact with at least one of the rods. As this condition is quite easily achieved when the detector is subjected to vibration, but unlikely to occur as a result of the presence of foreign matter, the reliability of the detector, as regards the prevention of "false alarms" is improved.

In practice, it is preferred that the opposite ends of the seismic elements which contact each other are hemispherical so as to allow for relative vibration between adjacent elements while maintaining point contact between these elements. Similarly, to facilitate rocking of the seismic elements on the rods, during vibration, it is preferred that each element is of circular transverse cross-section. It is therefore convenient to provide the seismic elements in the form of spherical balls. Where there are a plurality of such elements in the form of spherical balls, it is preferable, but not essential, that these balls are of equal diameter.

Although it is possible to provide three or more seismic elements, in practice it is normally sufficient to provide two such elements. Thus, in the manufacture of conventional, single element, vibration responsive detectors, it is normal practice to pay sufficient regard to dimensional accuracy and cleanliness to ensure that, when subjected to repreated tests, the detectors will only fail in a tiny percentage of cases. As a hypothetical example, if a detector was constructed with sufficient care to ensure that it would not fail more than once in one thousand operations, then if a detector provided with two seismic elements was constructed in accordance with the invention, with equal care, the failure rate would not merely be increased from one failure in one thousand plus one thousand equals two thousand operations (as in existing double element vibration detectors), the two elements would co-operate with each other as a result of their own electrical contact with each other to provide parallel electrical connections and the failure rate would theoretically increase to one failure in one thousand times one thousand equals one million operations. Clearly, although deficiencies arising from friction and wear normally make it impossible to obtain the theoretically obtainable reliability of operation, the actual reliability which is obtainable is very much higher than is required in normal operation and so it is possible to relax the stringent requirements of quality control and cleanliness, which are so costly to maintain, while still obtaining a detector having a reliability of operation which can be from ten to one hundred times greater than existing double element vibration detectors.

In detectors according to the invention, sensitivity may be varied by rotating the detector. Thus, sensitivity may be increased from a minimum, when the two rods which support the seismic elements are at the same level, by increasing the height of either one of these rods relative to the other. Clearly, however, when the detector is rotated so that one of the rods approaches a position directly below the centres of the seismic elements, it is clear that the elements become unstable and it is impossible to increase the sensitivity beyond a given maximum value.

In a detector such as this, in which there are at least three horizontally extending, electrically conductive rods, the rods may be arranged so that the seismic elements can be supported on at least two different pairs of rods, the lateral spacing of the rods in each such pair differing from the lateral spacing of rods in each other such pair so that each such pair is able to support the seismic elements with a different degree of sensitivity to vibration.

In this case, the longitudinal axes of the rods may lie in planes which radiate from a common axis of intersection and are disposed so that the angular separation between one pair of adjacent planes differs from the angular separation between another pair of adjacent planes.

Where there are at least four horizontally extending, electrically conductive rods which are each provided with a concave support surface, separate rods may be arranged in at least two pairs; the axes of the rods of each pair may lie in parallel planes; and the lateral spacing of the rods of each pair may differ from the lateral spacing of the rods of each other pair.

In a preferred construction, where there are at least two pairs of rods, the rods of each pair are symmetrically disposed on opposite sides of a common plane. Such a detector need only be inverted to be converted for operation at one sensitivity from operation at another sensitivity.

Where there are at least three horizontally extending, electrically conductive rods, these rods may be arranged so that the seismic elements are supported by a pair of support rods; a first detection circuit may be connected to said pair of support rods and operable to detect a broken circuit between said pair of support rods, as a result of vibration; and a second detection circuit may be connected to one of the support rods and to at least one of the rods provided in addition to the support rods so as to be operable to detect any electrical connection between said one of the support rods and said one of the rods provided in addition by means of at least one of the seismic elements.

BRIEF DESCRIPTION OF THE DRAWINGS

Three embodiments of the invention are hereinafter described, by way of example, with reference to the accompanying drawing, in which.

BEST MODES FOR CARRYING OUT THE INVENTION

Figure 1:
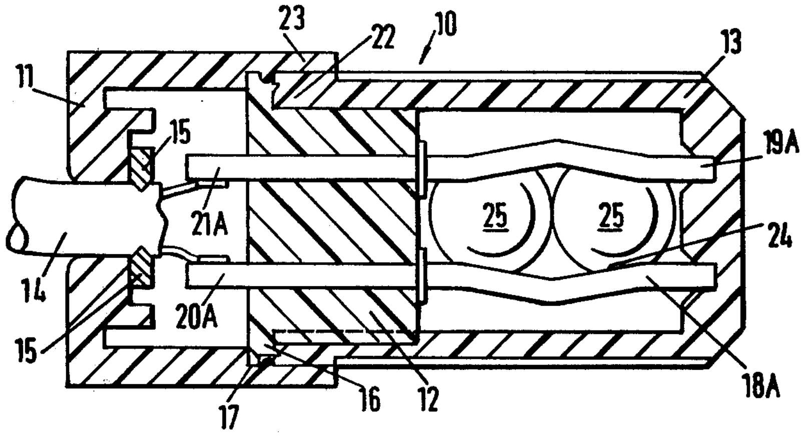
FIG. 1 is a sectional side elevation of a vibration responsive detector according to the present invention, in which two seismic balls are mounted alternatively on each of two pairs of rods.
Figure 2:
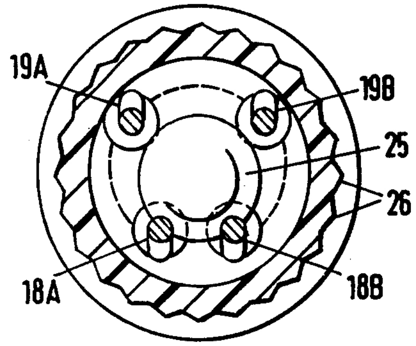
FIG. 2 is a sectional cross-section of the detector shown in FIG. 1, showing the seismic balls mounted on a first pair of rods.

As shown in FIGS. 1 and 2, a vibration responsive detector 10, according to the invention, comprises a plastics container having a cap 11, a core 12 and a thimble 13. The cap 11 has a central aperture for receiving an electrical cable 14 and clamping means 15 for securing the cable 14. The core 12 is provided with a radial flange 16 which can be seated as a snap fit in a radially inwardly facing groove 17 formed in the internal periphery of the rim 23 of the open end of the cap 11. Two pairs of gold-plated brass rods 18A, 18B and 19A, 19B are embedded in the core 12 and have inner ends 20A, 20B and 21A, 21B to which strands of cable 14 are respectively connected, as by soldering or spot welding. The rim 22 of the open end of the thimble 13 nests between the rim 23 of the cap 11 and the core 12 and is formed, at its inner end, with recesses for supporting the free ends of the rods 18A, 18B, 19A, and 19B. With this form of construction, the rods 18A to 19B are securely held in position and the plastics members of the detector may be secured together by ultrasonically welding the zones in which they overlap.

As shown in FIGS. 1 and 2, the two rods 18A and 18B are bent to form shallow "V"-shaped portions providing concave surfaces 24 for supporting two gold-plated brass balls 25 which rest on oppositely inclined ends of the "V"-shaped portions of the rods 18A and 18B so as to tend to roll towards each other, so maintaining point contact for electrical connection between the two balls 25.

Figure 3:
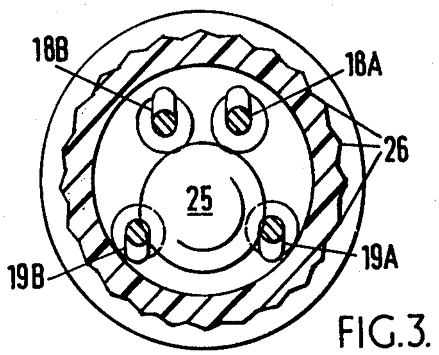
FIG. 3 is a cross-sectional elevation, similar to FIG. 2, but showing the seismic balls mounted on the other pair of rods.

As shown in FIG. 2, the axes of the rods 18A and 18B define parallel planes which are symmetrically disposed on opposite sides of a vertical plane passing through the axis of the detector 10. As also shown, the rods 19A and 19B are bent in a similar manner to the rods 18A and 18B and define two further parallel planes which are symmetrically disposed on opposite sides of the vertical plane of symmetry, but spaced more widely than the planes defined by the axes of the rods 18A and 18B. Thus, as shown in FIG. 3, when the detector 10 is inverted, and the balls 25 are supported on the rods 19A and 19B, the balls 25 are supported at more widely spaced lateral points and so are more stable and, thus, less sensitive to vibration. However, in both cases, the balls 25 are mounted on oppositely inclined ends of the "V"-shaped portions of the rods so as to be urged into contact with each other to maintain point contact for electrical connection.

Figure 4:
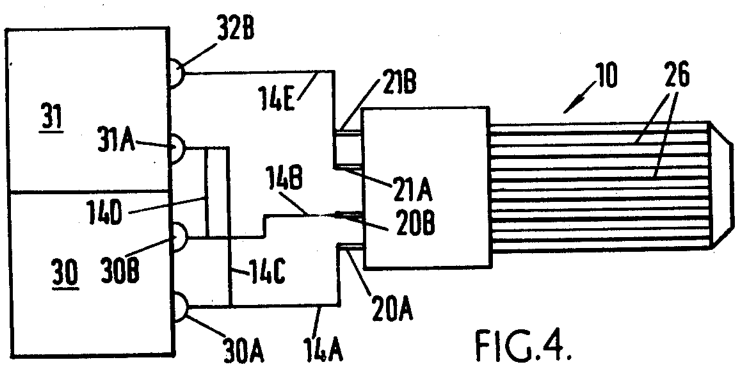
FIG. 4 is a schematic arrangement showing the vibration responsive detector of FIGS. 1 to 3 connected to first and second detection circuits for the detection and indication of vibration and shock loading.

As shown in FIG. 4, the ends 20A and 20B of rods 18A and 18B are connected by strands 14A and 14B to the terminals 30A and 30B of a first detection circuit 30 which is operable, in known manner, to detect open circuit conditions between the two rods 18A and 18B, as a result of vibration to which the detector is subjected. Strands 14C and 14D, extending respectively from strands 14A and 14B, are connected to terminal 31A of a second detection circuit which is operable, in known manner, to detect a closed circuit condition between either of the rods 18A and 18B with either of the rods 19A and 19B. Strand 14E connects ends 21A and 21B of rods 19A and 19B to terminal 31B of the second detection circuit 31. Clearly, when the detector 10 is inverted as shown in FIG. 3, the strands 14A to 14E of the cable 14 can be re-arranged so as to ensure that the end 21A and 21B of the rods 19A and 19B are connected to the first detection circuit 30 and that the appropriate connections are made to the second detection circuit 31.

In a practical embodiment constructed as shown in FIGS. 1 to 4, the rods 18A to 19B could be 1/16 inch diameter for supporting balls 25 of ¼ inch diameter.

Figure 5:
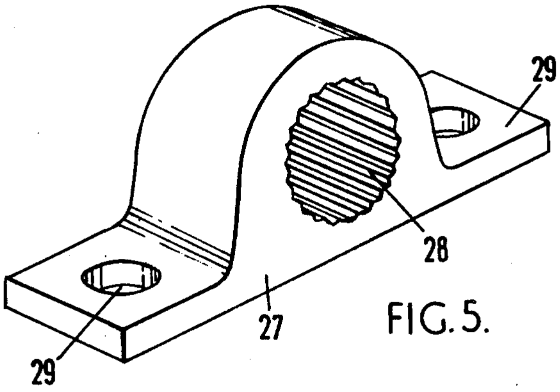
FIG. 5 is an isometric view of a bracket for supporting the detector illustrated in FIGS. 1 to 4.

As shown more clearly in FIGS. 2 and 3, the outer periphery of the thimble 13 is formed with twenty four equiangularly spaced, axially extending serrations 26 for insertion in an apertured bracket 27 (FIG. 5) having a complementary shaped inner periphery 28. One or both of these mating peripheries may be tapered so as to ensure that the detector 10 may be firmly wedged in position within the bracket 27. Thus, by suitably marking the end of the thimble 13 to indicate the position of the plane of symmetry between the rods 18A to 19B of each pair and the relative positions of each pair, the detector 10 may be mounted with the plane of symmetry not more than 15° out of vertical, regardless of the orientation of the bracket 27 which receives the thimble 13. The bracket 27 may therefore be provided with lugs 29, as shown, for attachment to inclined or horizontal surfaces, or may form part of a fitting for a junction box in which connections are made between the detector and the first and second detecting circuits.

Figure 6:
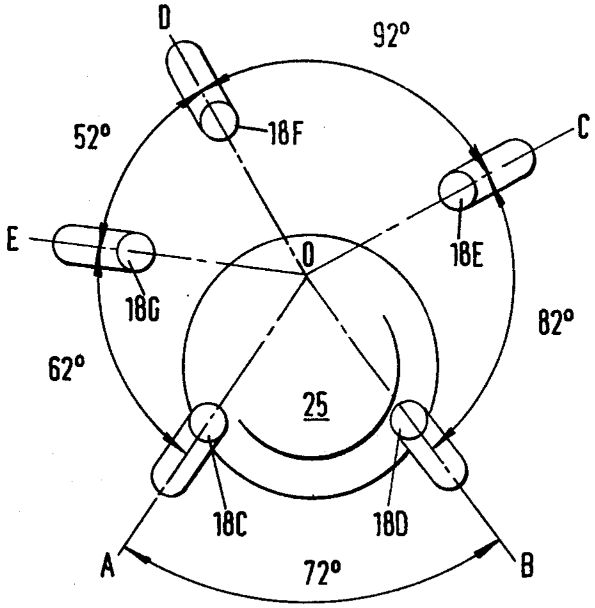
FIG. 6 is a schematic end view of part of a second form of vibration responsive detector, according to the invention, provided with five rods having axes which lie in planes which radiate from a common axis of intersection so that the angular spacing between each pair of adjacent planes is different to the angular spacing between each other pair of adjacent planes.
Figure 7:
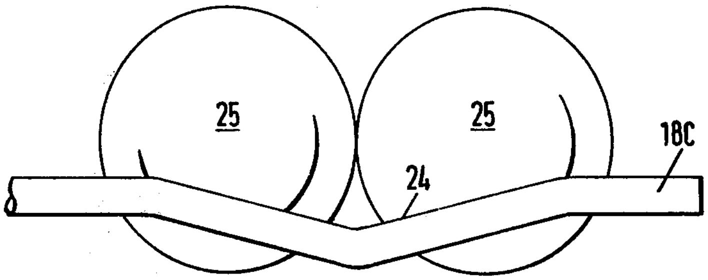
FIG. 7 is a side view of part of the apparatus shown in FIG. 6.

In the embodiment illustrated in FIGS. 6 and 7, five rods 18C, 18D, 18E, 18F and 18G are each bent to form shallow "V"-shaped portions providing concave surfaces 24 for supporting two balls 25 which rest on oppositely inclined ends of the "V"-shaped portions of adjacent pairs of rods so that the balls 25 tend to roll towards each other. However, in this case, the axes of the rods lie in five planes 0A, 0B, 0C, 0D and 0E which radiate from a common axis 0 of intersection and are angularly separated by 52°, 62°, 72°, 82° and 92°. Thus, by rotating the detector about the axis 0, differently spaced pair of rods may be arranged so as to support the two balls 25, thus providing different sensitivities of operation. In other respects, the detector is constructed as described with reference to FIGS. 1 to 3 and may be connected to detection circuits 30 and 31 in a similar manner to that described with reference to FIG. 4.

Figure 8:
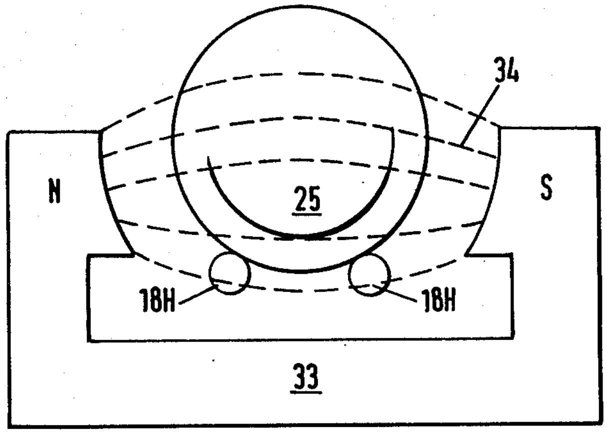
FIGS. 8 and 9 are end and plan views of a third embodiment of the invention and show a vibration responsive detector provided with a magnet for urging two ferro-magnetic seismic elements into contact with each other.
Figure 9:
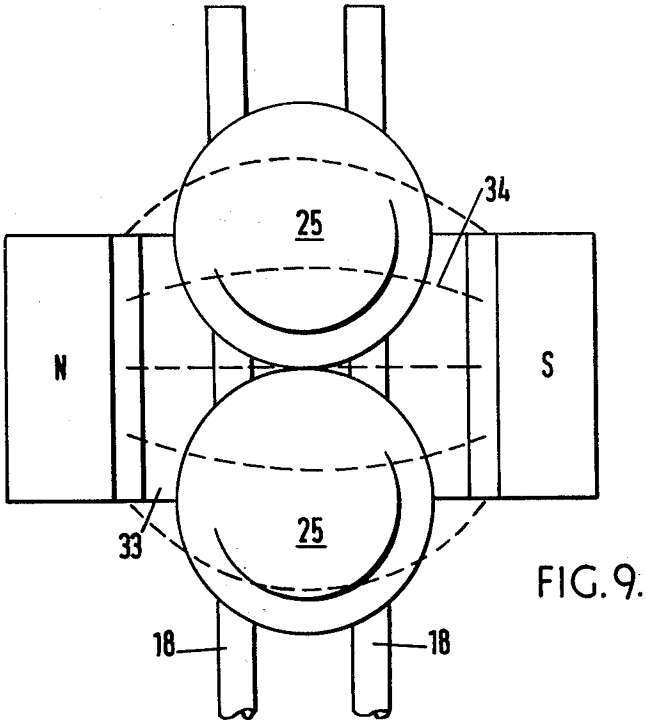

In the embodiment illustrated in FIGS. 8 and 9, two gold-plated steel balls 25 are mounted on two rods 18H, but in this case the rods have no bent portions and, consequently, no concave support surfaces. As shown, a magnet 33 is arranged with its north and south poles N and S disposed on opposite sides of the two balls 25 so that the balls 25 form part of the magnetic circuit for the magnetic field 34 extending between the poles N and S of the magnet 33. As a result, the balls 25 are urged into contact with each other so as to provide electrical connection without significantly restricting lateral movement of one ball 25 relative to the other. Apart from the provision of unbent support rods 18H and the magnet 33, the detector is constructed as described with reference to FIGS. 1 to 3.

Although reference numerals have been used in the appended claims to improve the intelligibility of these claims, it is expressly stated that these reference numerals should not be construed as limiting the claims to the constructions illustrated in the accompanying drawings.

What we claim is:

1. A vibration responsive detector comprising at least one pair of parallel, electrically conductive rods, at least two seismic elements, having electrically conductive outer surfaces, mounted on the rods of said one pair so as to provide parallel electrical connections between these two rods, characterised in that positioning means (24, 33) are provided for urging each seismic element (25) into contact with an adjacent seismic element (25) so as to ensure electrical connection between adjacent elements (25) irrespective of relative movement of adjacent elements (25) transversely of the rods (18, 19).

2. A detector, according to claim 1, characterised in that the seismic elements (25) are in the form of spherical balls.

3. A detector, according to claim 1 or claim 2, characterised in that the two seismic elements (25) both contain ferro-magnetic material and the positioning means comprise magnet means (33) positioned so as to provide a magnetic field (34) which urges the two seismic elements (25) towards each other.

4. A detector, according to claim 1, characterised in that the electrically conductive rods (18, 19) extend horizontally and the positioning means comprise concave support surfaces (24) respectively provided on the rods (18, 19) and arranged so as to support the seismic elements (25) so that each of the seismic elements (25) is urged, under gravity, towards the lowermost parts of the concave support surfaces (24) provided on the rods (18, 19) of said pair and, thereby, into contact with at least one adjacent seismic element (25).

5. A detector, according to claim 4, characterised in that there are at least three horizontally extending, electrically conductive rods (18A to 19B) which are each provided with a concave support surface, the rods (18A to 19B) are arranged so that the seismic elements (25) can be supported on at least two different combinations of two rods, the lateral spacing of the rods in each such combination differ from the lateral spacing of the rods in each other such combination so that each such combination is able to support the seismic elements (25) with a different degree of sensitivity to vibration.

6. A detector, according to claim 5, characterised in that the longitudinal axes of the rods (18A to 19B) lie in planes which radiate from a common axis of intersection and are disposed so that the angular separation between one pair of adjacent planes differs from the angular separation between another pair of adjacent planes.

7. A detector, according to claim 5, characterised in that there are at least four horizontally extending, electrically conductive rods (18A to 19B) which are each provided with a concave support surface; separate rods are arranged in at least two pairs (18A and 18B and 19A and 19B); the axes of the rods of each pair (18A and 18B or 19A and 19B) lie in parallel planes; and the lateral spacing of the rods of each pair (18A and 18B or 19A and 19B) differs from the lateral spacing of the rods of at least one other pair.

8. A detector, according to claim 7, characterised in that there are at least two pairs (18A and 18B or 19A and 19B) of rods and the rods are of a common plane.

9. Vibration detecting apparatus comprising a detector, according to any one of claims 5 to 8, arranged so that the seismic elements (25) are supported by a pair (18A and 18B or 19A and 19B) of support rods; and characterised by a first detection circuit (30) which is connected to the pair of support rods (18A and 18B or 19A and 19B) and operable to detect a broken circuit connection between said pair of support rods, as a result of vibration; and a second detection circuit (30) connected to at least one of the rods (19A or 19B) provided in addition to the support rods (18A and 18B) and to one of the support rods (18A and 18B) and operable to detect a connection between said one of the support rods (18A and 18B) and said one of the rods (19A or 19B) provided in addition.

10. A detector, according to claim 1, 2, 4, 5, 6, 7 or 8, characterised in that the rods (18, 19) are mounted in a container (13) having a generally cylindrical outer surface which is formed at equiangularly spaced intervals with identical axially extending formations (26) so that the container (13) can be axially inserted into an aperture (27), having complementary formations (28), in a plurality of different orientations.

* * * * *